United States Patent [19]

Wauk, II

[11] 3,818,379

[45] June 18, 1974

[54] ACOUSTIC SURFACE WAVE DEVICE

[75] Inventor: Michael T. Wauk, II, Agoura, Calif.

[73] Assignee: Hughes Aircraft, Culver City, Calif.

[22] Filed: Dec. 4, 1972

[21] Appl. No.: 312,098

[52] U.S. Cl. .................. 333/30 R, 310/9.8
[51] Int. Cl. .................. H03h 9/30
[58] Field of Search .............. 310/9.8; 333/30 R, 71, 333/72

[56] References Cited

UNITED STATES PATENTS

| | | | |
|---|---|---|---|
| 3,568,102 | 3/1971 | Tseng | 333/30 R |
| 3,688,223 | 8/1972 | Pratt et al. | 333/72 |
| 3,697,899 | 10/1972 | Dias | 333/30 R |

*Primary Examiner*—Paul L. Gensler
*Attorney, Agent, or Firm*—W. H. MacAllister; John Holtrichter, Jr.

[57] ABSTRACT

An acoustic surface wave device for delay line and filter applications and the like, the device being of the type having spaced couplers or transducers disposed on a surface wave propagating surface of a solid medium and, in order to significantly reduce undesired and generally degrading spurious signals arising from specular reflections from the transducers, the device further includes a surface wave acoustic wavefront rotating member disposed in the path of the surface wave between the transducers.

18 Claims, 6 Drawing Figures

ACOUSTIC SURFACE WAVE DEVICE

BACKGROUND OF THE INVENTION

The background of the invention will be set forth in two parts.

1. Field of the Invention

This invention relates to acoustic surface wave devices and more particularly to such devices including means for phase cancellation of triple-transit signals.

2. Description of the Prior Art

With the advancement of modern technology, there has arisen the problem of an ever-increasing requirement for efficient acquisition and processing of immense quantities of data in very short periods of time. In the communications field, for example, these problems concern the filtering, amplifying, and storing of received signals and also the processing and recognition of signals of a desired and known form.

For many years there has been an interest in elastic wave propagation devices, developed in what is generally known as microwave acoustic technology, for solving the aforementioned problems. In the earlier part of this work, the focus of attention of most workers in the field was concentrated on the phenomenon of bulk elastic waves, at acoustic or sound frequencies, propagating totally inside solids. For example, devices were constructed which employed bulk elastic waves for the storage or delay of signals. In these early delay lines, electrical signals were converted to elastic waves, usually by piezoelectric crystals, which propagated in the elastic solid and then reconverted to electrical form by a second transducer.

The advantage of sound frequency energy for these applications in solids is related to the excellent transmission characteristics of acoustic media and to the relatively low propagation velocity of approximately five orders of magnitude less than that of the speed of light or that of electromagnetic waves. As an example, an elastic wave resonator operating at a given frequency is typically 100,000 times smaller than an electromagnetic wave resonator for the same frequency, and the high Q of acoustic media allows delay times of about 100 times that possible with low-loss electromagnetic waves.

Most of the effort until recently has been associated with realizing bulk acoustic wave devices such as delay lines and amplifiers consisting of a crystalline block with opposite flat and parallel surfaces to which opposing piezoelectric transducers are attached. An input transducer converts an electrical signal to acoustic energy which is beamed through the medium to an output transducer. However, in most typical bulk devices it is almost impossible to tap, switch, vary the delay, vary the amplitude, or otherwise manipulate the acoustic energy during transit through the solid. Consequently, the use of these devices has been generally limited to passive devices and nondispersive delay lines.

This undesired restriction of access to the elastic wave has led to investigations of the elastic waves that can be propagated along the boundary surfaces of solids. This phenomenon was first described by Lord Rayleigh in an article entitled, "On Waves Propagated Along the Plane Surface of an Elastic Solid," Proceedings, London Mathematics Society, Vol. 17, pp. 4–11, Nov. 1885. Devices utilizing such surface waves have the advantage of allowing easy access at all times to the propagating acoustic energy, to sample it, and to modify and interact with it. It should therefore be evident that this permits the realization of a wider range of devices than with bulk waves.

Surface waves, in contrast to bulk waves, are localized to the surface of solids. The typical particle motion is elliptical, and the amplitude decays exponentially into the body of the medium. As to phase velocity, the speed of a surface wave is approximately ninety percent that of the bulk shear wave in most media. Probably the medium most widely used at the present time is one of several piezoelectric materials.

The basic building blocks of all surface wave devices is the acoustic surface wave delay line which includes spaced input and output transducers disposed on a piezoelectric substrate. The transducers now in general use are the interdigital type consisting of a series of conductive electrodes that form a pattern which is disposed on a substrate surface. The input interdigital transducer is a two-terminal device having two separate arrays of metal strips resembling interleaved figures and converts an incoming electrical signal into a time-dependent space-varying electric field pattern which, in turn, generates an acoustic surface wave directly on the substrate through the electrostatic action of piezoelectric crystals. Two of the most common substrate materials in use today are probably lithium niobate and quartz, the substrate providing the electro-acoustic energy conversion and also the desired acoustic signal delay path.

Most common transducers, including the popular interdigital type, are normally bidirectional, in that equal amounts of acoustic power radiate in two opposite directions therefrom. Accordingly, delay lines utilizing these transducers can never exhibit less than at least a 6 db insertion loss, since half the power is radiated in the wrong direction. Adding further to the problem, if not properly terminated, the backwave can be reflected at the substrate edge and cause a spurious signal in the output. This undesired result may be avoided by depositing an absorbing material, such as black wax, on the substrate edge, or the substrate surface may be etched behind the transducer to scatter the backwave energy.

There is, however, still another problem in using bidirectional transducers. The most serious is the problem of multiple reflections between the couplers or transducers, caused when a transducer reflects, as well as absorbs, a portion of the energy incident on it. These multiple reflections are a basic characteristic of lossless three-port junctions which applies to a bidirectional transducer that launches two surface waves.

Here, there is one electrical port and two acoustic ports. A three-port junction, as may be shown by scattering matrix analysis, will, under ideal matching conditions, reflect about one-quarter of the power incident on it. Thus, in any bidirectional transducer delay line system, a significant amount of signal energy incident on the output coupler will be specularly reflected back to the input coupler where it is again reflected, each reflection causing a 6 db drop in power level. Unless prevented, this inherent spurious echo, called the triple-transit signal, will be seen in the delay line output at a level only 12 db below that of the original delayed signal which made the trip only once.

Schemes endeavoring to overcome the triple-transit problem have been discussed and developed. One such solution is a unidirectional transducer which suppresses acoustic energy travelling through it the wrong way. It is made with two bidirectional transducers having a common ground and arranged in a collinear array such that the electromagnetic signal is fed equally in amplitude to the two transducers, but the phase must differ by $\pi/2$ at each transducer. This is usually accomplished by using a 3 db quadrature hybrid structure so that stress contributions from the two transducers will add in phase for propagation in the forward direction and will cancel for propagation in the reverse direction. Although providing desirable results, this scheme is rather difficult and costly to fabricate and causes the operating bandwidth of the device to be reduced by two-thirds.

In the case of transducers whose design is constrained by bandwidth and response considerations, the acoustic reflection coefficient cannot be made arbitrarily small. Accordingly, some attention has been given to the use of a surface wave amplifier to solve this problem. In principle, this approach has merit, but much must be accomplished before a low-cost and stable amplifier is made commercially available.

Still another method to reduce these spurious enchoes is to rotate one transducer with respect to the other by a small angle. This effects a tilt or rotation of the spurious-wave phase front with respect to the receiving transducer. At an angle that is generally smaller than that which would result in significant displacement of the acoustic beam at the receiving transducer (because of the anisotropy of commonly used materials) a null can occur due to phase cancellation when the phase of the wavefront changes by $2\pi$ radians over the transducer aperture.

This technique has been previously applied to the suppression of such signals in bulk wave delay lines, and may be reviewed in more detail by viewing the following references: Ultrasonic Delay Lines, by C. F. Brockelsby, J. S. Palfreeman and R. W. Gibson, published by Iliffe Books Ltd., Dorset House, London, 1963, at page 72; an article by E. Gates in the Proceedings of the IEEE, Vol. 52, p. 1,129 (1964); and an article in IEEE Transactions, Ultrasonic Engineering, UE 10, p. 74 (1963) by E. Lax, M. Pedinoff, and E. Fittig. This approach may be briefly summarized by assuming straight-crested surface waves of uniform amplitude, where a simple integration shows that the transducer power response varies as $P = P_o \operatorname{sinc}^2\alpha\theta$ where $\operatorname{sinc}x = \sin\pi x/x$, $\theta$ is the angle between the transducer electrode normal and the surface wave propagation vector, and $\alpha$ is the receiving transducer aperture in wavelengths.

If one of the transducers is rotated with respect to the other by a small angle $\phi$, the wavefront angle is $\theta = 3\phi$ after two specular reflections; hence the spurious signal output is $P_o\operatorname{sinc}^2 3\alpha\phi$, while the main signal output is $P_o\operatorname{sinc}^2\alpha\phi$. The triple transit is nulled when $\phi = 1/3\alpha$.

The fabrication of a delay line with a rotated transducer is accomplished by either using photomasks which incorporate the rotation, or by exposing the two transducers separately and rotating the mask for one transducer by the required amount. Both of these approaches have the disadvantage of being costly in labor and instruments.

SUMMARY OF THE INVENTION

In view of the foregoing factors and conditions characteristic of the prior art, it is a primary object of the present invention to provide an improved acoustic surface wave device whereby undesired spurious signals arising from specular reflections from the device's transducers are significantly reduced.

It is another object of the present invention to provide a high-performance acoustic surface wave device that is simple to fabricate and yet includes means for suppressing triple-transit signals.

It is still another object of the present invention to provide an acoustic surface wave device wherein the acoustic wavefronts are tilted a predetermined amount for phase cancellation of undesired specular reflections.

It is yet a further object of the present invention to provide an advanced acoustic surface wave device having, in addition to means for tilting acoustic wavefronts, means for continuously varying the aperture of a propagating wave in order to adjust the first mentioned means for optimum operation.

In accordance with an embodiment of the present invention, an acoustic surface wave device includes a solid medium having a surface wave propagating surface and coupling means with electric signal transducing couplers disposed in spaced relationship on the propagating surfaces for launching and detecting surface waves propagating between the couplers, a portion of the propagating surface wave energy being specularly reflected by the couplers. Also, the device includes rotation means including at least one element of conductive material disposed in the path of the surface waves between the couplers for tilting the wave front of the surface waves and thereby reducing the detected surface wave energy being specularly reflected.

The rotation means may take the form of a triangular-shaped, thin metal film which slows a surface wave on a piezoelectric substrate. Also, performance may be enhanced by reducing the aperture of a propagating wave through mechanical absorption of energy of certain portions of the acoustic beam by disposing an acoustic lossy material on the device substrate.

The features of the present invention which are believed to be novel are set forth with particularity in the appended claims. The present invention, both as to its organization and manner of operation, together with further objects and advantages thereof, may best be understood by making reference to the following description, taken in conjunction with the accompanying drawings, in which like reference characters refer to like elements in the several views.

DESCRIPTION OF THE PREFERRED EMBODIMENTS

Figures 1, 2, 3:
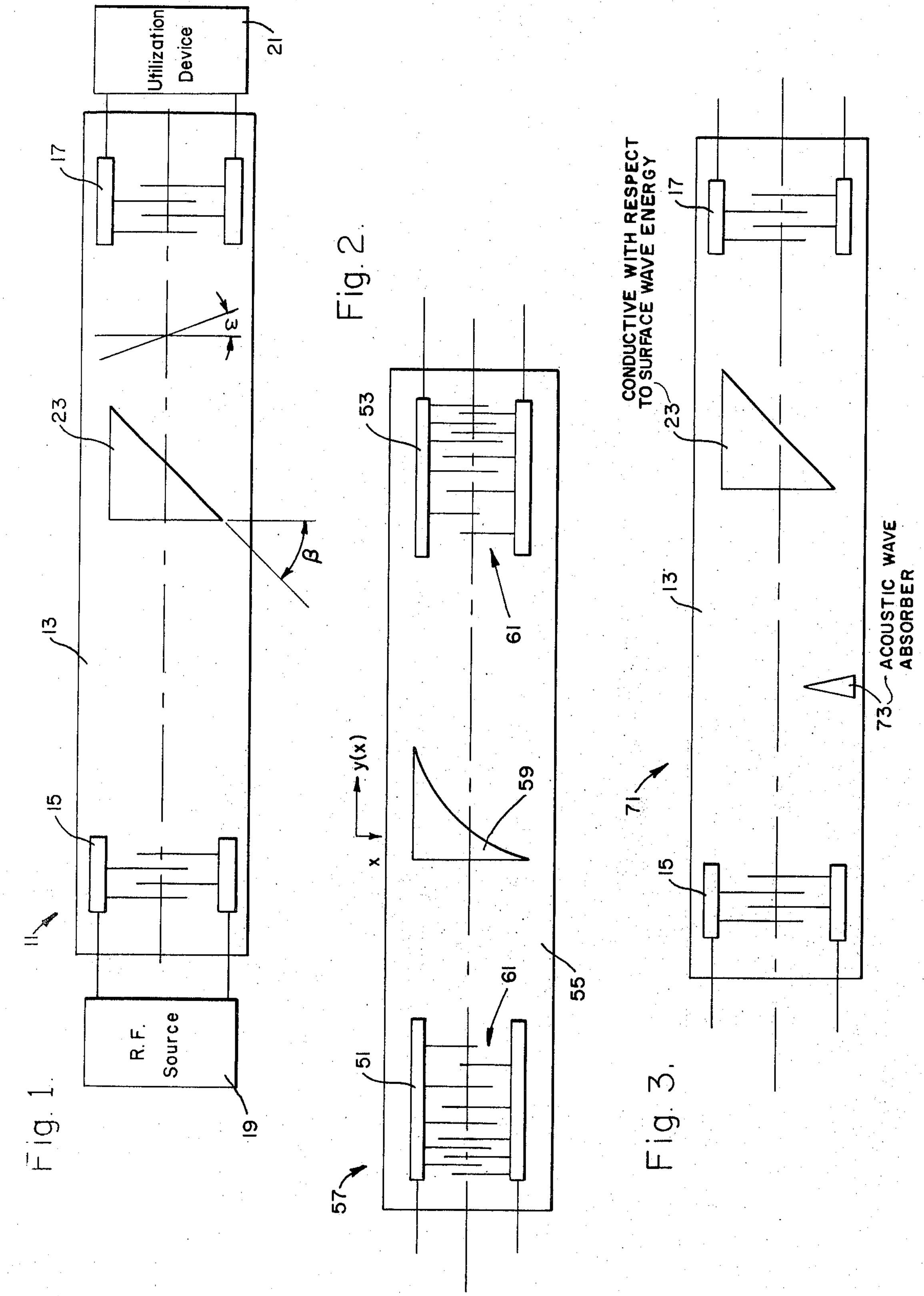
FIG. 1 is a partially schematic plan view of an acoustic surface wave device in accordance with the present invention.
FIG. 2 is a partially schematic plan view of a device in accordance with another embodiment of the invention.
FIGS. 3, 5 and 6 are partially schematic plan views of still other embodiments of the present invention, each incorporating an acoustic energy absorbing element in the acoustic beam path.

Referring now to the drawings and more particularly to FIG. 1, there is shown an acoustic surface wave device 11 in a basic delay line configuration. In this figure, an elongated slab or substrate 13 of an elastic material capable of supporting surface waves is provided with an input transducer 15 and an output transducer 17 spaced therefrom. A conventional source of RF energy, indicated generally by block 19, is electrically coupled to the input transducer 15, the source possibly including suitable electromagnetic tuning elements, as are well known in the art. A utilization device, indicated generally by block 21, is in turn electrically coupled to the output transducer 17.

In this embodiment, the substrate 13 is fabricated from a piezoelectric material of the type suitable for propagating acoustic surface waves. Many such materials have been employed for this purpose and their characteristics may be found in recent technical literature. For example, such materials as $LiNbO_3$, CdS, ZnO, $Bi_{12}GeO_{20}$, and $SiO_2$ have been utilized for this purpose. It should here, however, be pointed out that certain elastic but nonpiezoelectric materials will also support surface waves and, if a suitable transducer is employed, may be used in the subject devices.

Generally, the surface of the substrate 13 is ground and polished to an optical quality finish in order to reduce surface imperfections to a minimum. The transducers 15 and 17 are shown in the drawings in simplified schematic form and are of the well-known interdigital electrode array type, bonded or otherwise mechanically attached to the upper polished surface of the substrate 13. These transducers may have any desired number of intermeshed electrodes and be formed of any suitable electrically conductive materials, such as aluminum or gold, for example. The thickness of the deposited conductive material comprising the transducers is not critical and can typically be of any order of 500 to 1,000 A. or more. references such as an article entitled "Surface Elastic Waves," by Richard M. White in the Proceedings of the IEEE, Vol. 58, No. 8, August 1970, may be consulted for a more detailed description of the acoustic surface wave transducer art.

As noted previously, it has been a known practice to rotate one of the transducers with respect to the other in order to produce a reduction in the response of an output transducer to transducer-caused specular acoustic energy propagating along the substrate by virtu of phase cancellation of this energy along the transducer's electrodes. In accordance with this embodiment of the present invention, a similar tilting of the acoustic wave front is provided by depositing a thin metal film 23 between the two transducers in the form generally of a triangle. The metal film 23 is thin compared to the acoustic wave length to avoid any dispersion due to mass loading, and the triangular pattern is used because the film slows the surface waves on the substrate 13, and this shape causes a tilting of the acoustic wave fronts by an angle $\epsilon$ with respect to the wavefront incident on the metal film 23. The metal-film angle $\beta$ is chosen such that tan $\beta$ equals tan $\epsilon$ $(\Delta v/v)^{-1}$, where $\Delta v/v$ is the fractional velocity change due to the film 23.

The spurious echo power is thus reduced by $\text{sinc}^2\, 3\alpha\epsilon$ as in the case of the rotated transducers, and the main signal power is also reduced, but only by $\text{sinc}^2\alpha\epsilon$. In the case of Y-cut Z-propagating $LiNibO_3$, the value of $\Delta v/v$ is small, only about .0241. Thus, the tilting angle $\beta$ is a relatively large angle of approximately 20°. The absolute tolerances on $\beta$ are much larger than the tolerances on $\phi$ for the Y-cut $LiNiBO_3$ for example, to make fabrication of the metal film element 23 relatively simple. In fact, the film element 23 may be easily added to existing acoustic surface wave devices or to an existing photomask for future devices. Although a metal film has been mentioned, a thin film or layer of any material, such as a semiconductor, which is conductive with respect to the surface wave energy may be used for the element 23.

The function $\text{sinc}^2\, 3\alpha\epsilon$ is zero at only one frequency, since $\alpha$ is proportional to frequency in the usual periodic transducer. Hence, the spurious triple-transit signal is truly zero over a relatively narrow band. However, in more advanced transducers such as input and output apodized dispersive array transducers 51 and 53, respectively, shown in FIG. 2 disposed on a substrate 55 of an embodiment 57, there is a special separation in a direction $x$ transverse to the propagation path $y(x)$ of signals at different frequencies and a metal film 59 of a more suitable and general shape may be employed to reduce the triple echo across the frequency range of the acoustic surface wave device 57. For example, if the length of the transducer electrodes 61 vary as $1/f$, then $\alpha$ is a constant and a triangular film would serve to cancel the spurious triple echo at all frequencies. Suitable metal film shapes for more complex apodization may be found by well-known analytical methods. This wide frequency range aspect constitutes still another advantage in using the metal wedge technique for spurious specular energy reduction over the prior art method of rotating one transducer with respect to the other. In a 100 MHz delay line construction in accordance with this invention, the undesired triple-transit signal was reduced from 10 db to 40 db, while the main delayed signal was reduced only about 2 db.

Athough quite satisfactory results have been obtained with device constructions as described above, it has been observed that surface waves on anisotropic materials are, in general, not straight-crested waves and are not of uniform intensity across the beam because of the diffraction in the near field. Hence, the triple-transit null is to be expected to occur at a rotation angle somewhat different from the angle predicted by phase-wave theory, and is expected to depend upon the propagation distance as well.

This distortion problem is an important consideration in all acoustic surface wave devices that are designed to take advantage of phase cancellation to discriminate against spurious signals, such as the metal wedge embodiment 71 shown in FIG. 3. Here the substrate, transducers, and metal wedge elements are similar to those in the first described embodiment 11, but a special acoustic energy-absorbing element 73 is disposed on the substrate 13 between the transducers 15 and 17 and in the acoustic beam path therebetween.

The element 73 acts to reduce the aperture of the propagating acoustic wave energy through mechanical absorption, in this presently preferred case, at one edge of the beam. This may be simply accomplished by pressing an acoustically lossy material, such as rubber, against the delay line substrate surface 13 and moving and orienting it while monitoring the rejection of the undesired triple-transit signal (through variation of $\alpha$), until maximum suppression is obtained. The absorbing element may then be permanently attached to the device of any conventional bonding means.

Figure 4:
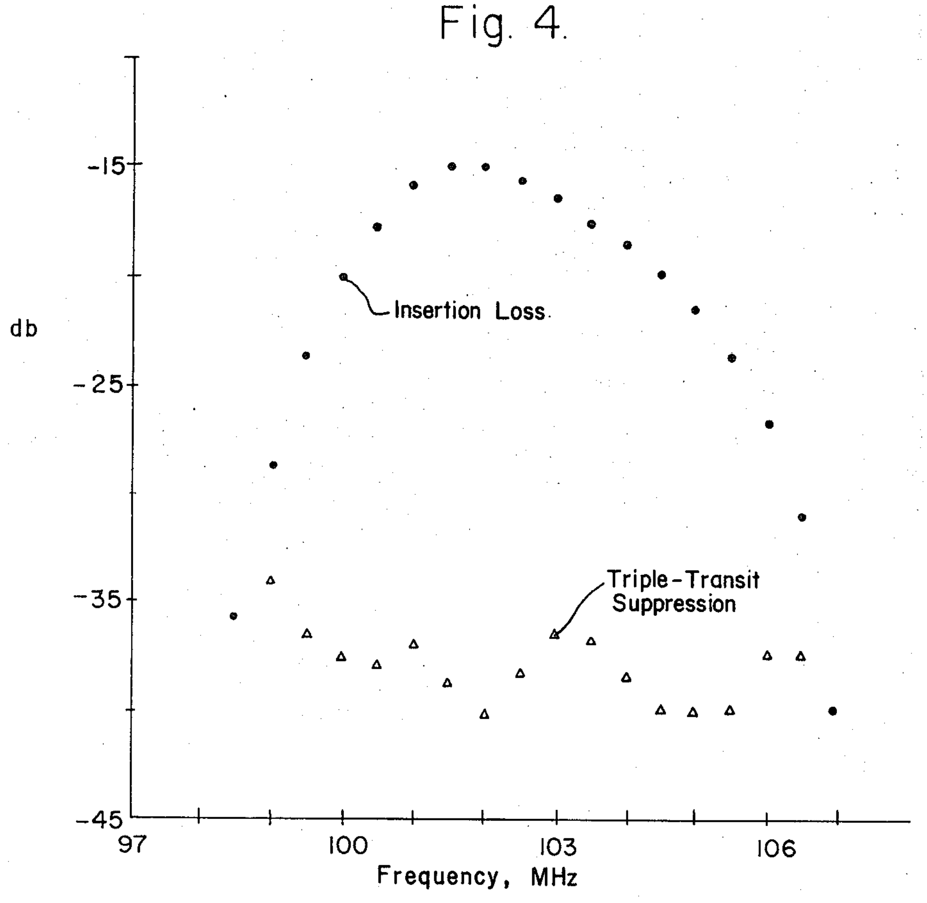
FIG. 4 is a graphical representation of both the insertion loss and triple-transit energy suppression characteristic of a typical acoustic surface wave delay line constructed with a metal wedge and an acoustic energy absorbing element, in accordance with the present invention.

Several orientation angles of the metal wedge element 23 have been tested in a basic acoustic surface wave delay line having untuned 20-electrode-pair transducers 15 and 17 operating at 100 MHz. Without aperture limiting by the element 73, the triple-transit suppression was improved about 8 db for those angles chosen. By slightly reducing $\alpha$ with the rubber probe 73, however, a 21 db increase in the desired suppression was achieved with several wedge angles to give 37 db suppression, as shown in the graphical representation of FIG. 4. The suppression loss in the absence of the metal wedge 23 and the $\alpha$ reducer element 73 was 13 db. This constitutes an insertion loss increase of only 2 db by the addition of the $\alpha$ reducer and the wedge. It was also found that the $\alpha$ reducer element 73 produced the desired effect at any position along the delay line path, and that the fifth-transit signal was smaller than the triple-transit signal across the band.

Figure 5:
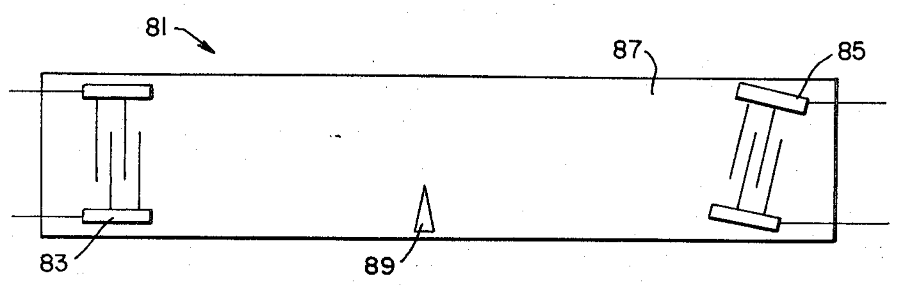
Figure 6:
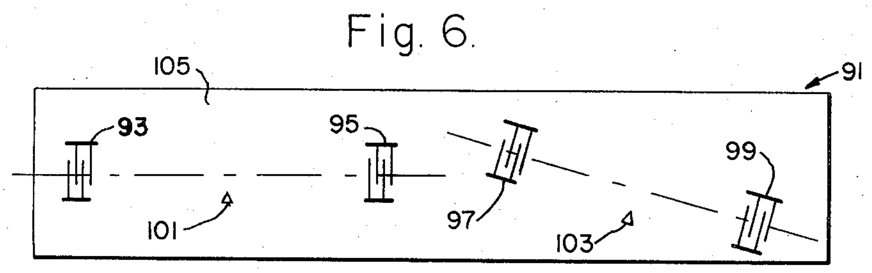

The $\alpha$ limiting by acoustic wave absorption may also be applied to prior art acoustic surface wave devices relying on phase cancellation to suppress specular acoustic energy signals. An example of such a device is illustrated in FIG. 5, where a delay line includes an input transducer 83 and a rotated output transducer 85, both disposed on an acoustic surface wave supporting substrate 87. In accordance with the present invention, the performance of the prior art structure may be greatly enhanced by an acoustic energy absorbing element or alpha probe 89 in the path of the propagating acoustic energy between the transducers. This advantageous result may also be obtained in a surface wave device 91 having one set of transducers 93 and 95 isolated from another set of transducers 97 and 99 by rotation, as shown in FIG. 6. Here, alpha probes 101 and 103 are positioned on a common substrate 105 in the respective acoustic energy paths of the respective sets of transducers to prevent some of the propagating acoustic energy from reaching the receiving transducer and allows an adjustment in the rejection of the undesired specular signal.

It should be recognized at this point that because of the fact that the distortion problem cannot be accurately predicted from plane-wave theory, and that it also depends on propagation distance, machine calculation would probably be required for constructing the above-described acoustic surface wave devices in order to determine the orientation angle of the metal wedge elements and the rotation of the output transducer in prior art configuration. Furthermore, new calculations would be necessary for every aperture and propagation distance in order to properly account for the diffraction, in order to obtain optimum operation. Thus, the acoustic energy-absorbing alpha probe herein described constitutes a simple yet very effective way to optimize the performance of subject devices and is broadly applicable to any surface wave device that depends upon phase cancellation due to scattering from surface imperfections or diffraction.

From the foregoing, it should be evident that there has herein been described an improved acoustic surface wave device whereby undesired spurious signals arising from transducer-caused specular energy are significantly reduced, and whereby the aperture of the propagating acoustic energy may be continuously varied in order to optimize the spurious signal suppression.

It should be understood that the materials used to fabricate the various embodiments of the invention are not critical and any material exhibiting similar desired characteristics may be substituted for those mentioned. Likewise, any transducer adapted to launch acoustic surface wave energy along a particular acoustic surface wave supporting substrate may be utilized. The above-described metal wedge may be fabricated from such metals as aluminum, for example, or a similarly-functioning non-metal. Accordingly, it should be realized that the invention is not limited to any particular application and may be incorporated in both constructed and future constructions using both dispersive and nondispersive transducers. Thus, although the present invention has been shown and described with reference to particular embodiments, various changes and modifications obvious to one skilled in the art to which the invention pertains are deemed to be within the spirit, scope, and contemplation of the invention.

What is claimed is:

1. An acoustic surface wave device comprising:

a solid medium having a surface wave propagating surface;

coupling means including electric signal transducing couplers disposed in spaced relationship on said surface for launching and receiving surface waves propagating between said couplers, a portion of the propagating surface wave energy being specularly reflected by said couplers; and rotation means including at least one essentially nonrefractive element of conductive material having two elongated edges upon which said propagating surface wave energy impinges, at least one of said edges being planar, said element being disposed on said propagating surface in the path of said surface waves between said couplers for tilting the specularly reflected wave front of said surface waves and thereby reducing the received surface wave energy resulting from specular reflections.

2. The device according to claim 1, wherein said element of conductive material is a metal film having an acoustic wave front tilting shape and having a thickness which is thin relative to the wave length of said acoustic wave energy.

3. The device according to claim 2, wherein said shape of said metal film causes a tilting of said acoustic wave front by an angle $\epsilon$ relative to the plane of the wave front incident on said metal film, and the metal film angle $\beta$ is such that $\tan \beta = \tan \epsilon\ (\Delta v/v)^{-1}$ where $\Delta v/v$ is the fractional velocity change due to said film.

4. The device according to claim 2, wherein said shape of said metal film is generally triangular.

5. The device according to claim 1, also comprising an acoustic energy-absorbing element disposed on said surface in the path and reducing the aperture of said propagating surface wave energy.

6. The device according to claim 5, wherein said acoustic energy-absorbing element is rubber.

7. An acoustic surface wave device comprising:
a solid elastic medium having a substrate which supports surface wave energy;
transducer means disposed on said substrate for launching and receiving surface waves propagating on said substrate, a portion of the propagating surface wave energy being specularly reflected by said transducer means; and
rotation means including an essentially non-refractive body having two elongated edges upon which said propagating surface wave energy impinges, at least one of said edges being planar, said element being disposed on said substrate in the path of said surface waves and spaced from said transducer means for tilting the specularly reflected wave front of said surface waves and through phase cancellation at said transducer means, reducing the received surface wave energy resulting from specular reflection.

8. The device according to claim 7, wherein said body is a wedge-shaped element that is conductive of said surface wave energy.

9. The device according to claim 8, wherein said element is metal.

10. The device according to claim 8, wherein said element is a semiconductor.

11. The device according to claim 7, also comprising acoustic energy-absorbing means disposed on said substrate in the path of said propagating surface waves for reducing the aperture thereof.

12. The device according to claim 11, wherein said acoustic energy-absorbing means includes a rubber element disposed at the side of the path of said propagating surface waves.

13. The device according to claim 8, wherein said transducer means includes a pair of interdigital electrode array type transducers in spaced relationship.

14. The device according to claim 13, wherein said transducers include electrodes with links that vary as $1/f$ and the transducer aperture is a constant, and wherein said wedge-shaped element is a triangular metal film.

15. An acoustic surface wave device, comprising:
a solid elastic medium of anisotropic material having a substrate which supports surface wave energy;
transducer means including spaced transducers disposed on said substrate for launching and detecting surface waves propagating on said substrate, a portion of the propagating surface wave energy being specularly reflected by said transducers;
means for tilting the specularly reflected wave front of said surface waves and reducing the detected surface wave energy resulting from specular reflections; and
absorption means including acoustically lossy material disposed on said substrate in the path of said acoustic beam energy for reducing the aperture of said propagating surface waves.

16. The device according to claim 15, wherein said lossy material is rubber disposed at the side of the path of said propagating surface waves.

17. The device according to claim 15, wherein said means for tilting said wavefront is at least one element of conductive material disposed in the path of said surface waves between and spaced from said transducers.

18. The device according to claim 15, wherein said means for tilting said wave front includes one of said transducers being rotated with respect to the other by a predetermined angle to reduce said detected specularly reflected surface wave energy by phase cancellation.

* * * * *